(12) United States Patent
Yamaguchi

(10) Patent No.: US 6,469,802 B1
(45) Date of Patent: Oct. 22, 2002

(54) TILT ADJUSTING MECHANISM FOR DISPLAY

(75) Inventor: Masahiro Yamaguchi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/233,488

(22) Filed: Jan. 20, 1999

(30) Foreign Application Priority Data

Feb. 6, 1998 (JP) .......................................... 10-041370

(51) Int. Cl.$^7$ ................................................ G06F 1/00
(52) U.S. Cl. ...................... 358/1.8; 361/681; 361/682; 248/278.1; 248/418; 16/337
(58) Field of Search .......................... 358/1.8; 345/156, 345/173, 178; 235/127, 106; 361/681, 682; 248/161, 278.1, 418, 183.1

(56) References Cited

U.S. PATENT DOCUMENTS

| | | | | |
|---|---|---|---|---|
| 5,168,426 A | * | 12/1992 | Hoving et al. ............... | 361/392 |
| 5,206,790 A | * | 4/1993 | Thomas et al. .............. | 361/380 |
| 5,255,214 A | * | 10/1993 | Ma ........................... | 364/708.1 |
| 5,333,116 A | * | 7/1994 | Hawkins et al. ........... | 364/708.1 |
| 5,345,362 A | * | 9/1994 | Winkler ....................... | 361/681 |
| 5,383,138 A | * | 1/1995 | Motoyama et al. ........ | 364/708.1 |
| 5,668,570 A | * | 9/1997 | Ditzik ......................... | 345/173 |
| 5,812,368 A | * | 9/1998 | Chen et al. .................. | 361/681 |
| 6,005,767 A | * | 12/1999 | Ku et al. ..................... | 361/681 |
| 6,016,171 A | * | 1/2000 | Tsao ........................... | 346/836 |
| 6,076,786 A | * | 6/2000 | Meyer ......................... | 248/161 |
| 6,152,550 A | * | 11/2000 | Yamaguchi ............... | 312/223.2 |
| 6,189,842 B1 | * | 2/2001 | Gull et al. ............... | 248/125.1 |
| 6,247,768 B1 | * | 6/2001 | Yamaguchi ............... | 312/223.2 |
| 6,266,236 B1 | * | 7/2001 | Ku et al. ..................... | 361/681 |
| 6,288,891 B1 | * | 9/2001 | Hasegawa et al. .......... | 248/923 |
| 6,378,830 B1 | * | 4/2002 | Lu ............................... | 16/337 |

* cited by examiner

Primary Examiner—Edward Coles
Assistant Examiner—Tia Carter
(74) Attorney, Agent, or Firm—Louis Woo

(57) ABSTRACT

A display tilt adjusting apparatus which may be employed in an electronic terminal device such as an electronic cash register is provided. The apparatus includes a pivotal support member, a stay, and a stay holding mechanism. The pivotal support member supports a display unit pivotably. The stay is connected to the display unit. The stay holding mechanism holds the stay to keep a display surface of the display unit at a set angular position. The stay holding mechanism is designed to produce a given degree of resistance to movement of the stay in a direction in which the display surface tilts rearward and keeps the stay free from the resistance in response to movement of the stay in an opposite direction in which the display surface tilts frontward.

4 Claims, 7 Drawing Sheets

TILT ADJUSTING MECHANISM FOR DISPLAY

BACKGROUND OF THE INVENTION

1. Technical Field of the Invention

The present invention relates generally to an improved tilt adjusting mechanism for a display which is suitable for electronic terminal devices such as electronic cash registers.

2. Background Art

FIG. 15 shows a conventional electronic cash register which includes a display 60 and a key board 61. Data is inputted using the key board 61 and then indicated on the display 60.

The display 60 is stationary on the cash register and impossible to tilt to a desired angular position at which the display faces an operator in alignment with his or her line-of-sight.

SUMMARY OF THE INVENTION

It is therefore an object of the invention to provide a tilting mechanism for a display which is suitable for an electronic terminal device such as electronic cash register.

According to one aspect of the invention, there is provided a display tilt adjusting apparatus which comprises: (a) a pivotal support member supporting a display unit pivotably within a given angular range; (b) a stay connected to the display unit; and (c) a stay holding mechanism holding the stay to keep a display surface of the display unit at a set angular position. The stay holding mechanism produces a given degree of resistance to movement of the stay in a first direction in which the display surface tilts rearward and keeps the stay free from the resistance in response to movement of the stay in a second direction opposite the first direction in which the display surface tilts frontward.

In the preferred mode of the invention, the stay is made of a strip member. The stay holding mechanism includes a holder, a sliding member, a roller, and an elastic member. The holder retains the sliding member, the roller, and the elastic member. The sliding member guides sliding movement of the stay in the first and second directions. The elastic member elastically presses the roller against the sliding member to form a nip therebetween through which the stay passes. The roller is supported by the holder to be movable in a third direction oriented at a given angle to the first and second directions in which the roller is responsive to the movement of the stay in the second direction to move to release the stay from the nip.

The holder of the stay holding mechanism includes a plate member having a major wall and side walls extending from the major wall substantially perpendicular to the major wall. The sliding member is attached to the major wall. The side walls has formed therein elongated holes through which the roller is inserted and which extend in the third direction. The elastic member is made of a spring connected to an end of the roller and a portion of the holder to urge the roller against the sliding member to form the nip through which the stay passes.

According to another aspect of the invention, there is provided an information terminal device which comprises: (a) a housing; (b) a display unit mounted on the housing pivotably within a given angular range; and (c) a display tilt adjusting mechanism. The display tilt adjusting mechanism includes a stay and a stay holding mechanism. The stay has a given length and is connected at one end to the display unit. The stay holding mechanism holds the stay to keep a display surface of the display unit at a set angular position, produces a given degree of resistance to movement of the stay in a first direction in which the display surface tilts rearward, and keeps the stay free from the resistance in response to movement of the stay in a second direction opposite the first direction in which the display surface tilts frontward

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiments but are for the purpose of explanation and understanding only.

In the drawings.

DESCRIPTION OF THE PREFERRED EMBODIMENTS

Figure 1:
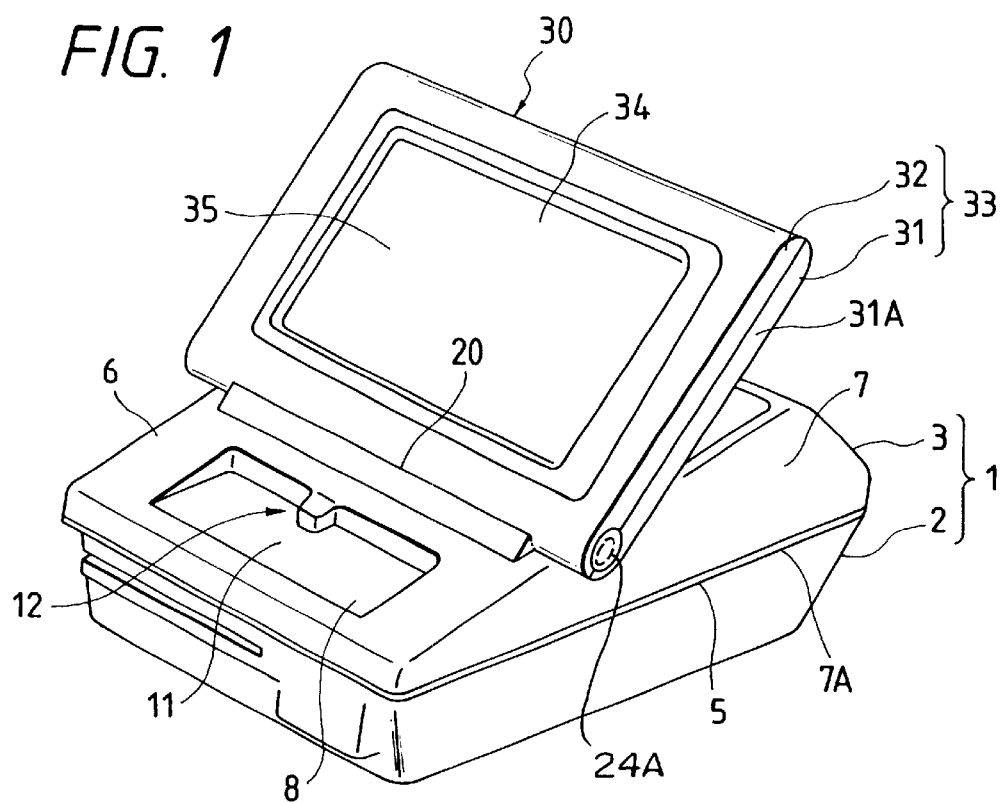
FIG. 1 is a perspective view which shows an electronic cash register according to the invention.

Referring now to the drawings, particularly to FIG. 1, there is shown an electronic cash register with a display tilt adjusting mechanism according to the present invention.

The electronic cash register has a housing 1. The housing 1 consists of a lower casing 2 and an upper casing 3. The lower casing 2 has disposed therein a chassis mount (not shown) having the bottom in which an opening is formed. The lower casing 2 has an engaging portion 5 formed on an upper edge.

Figure 4:
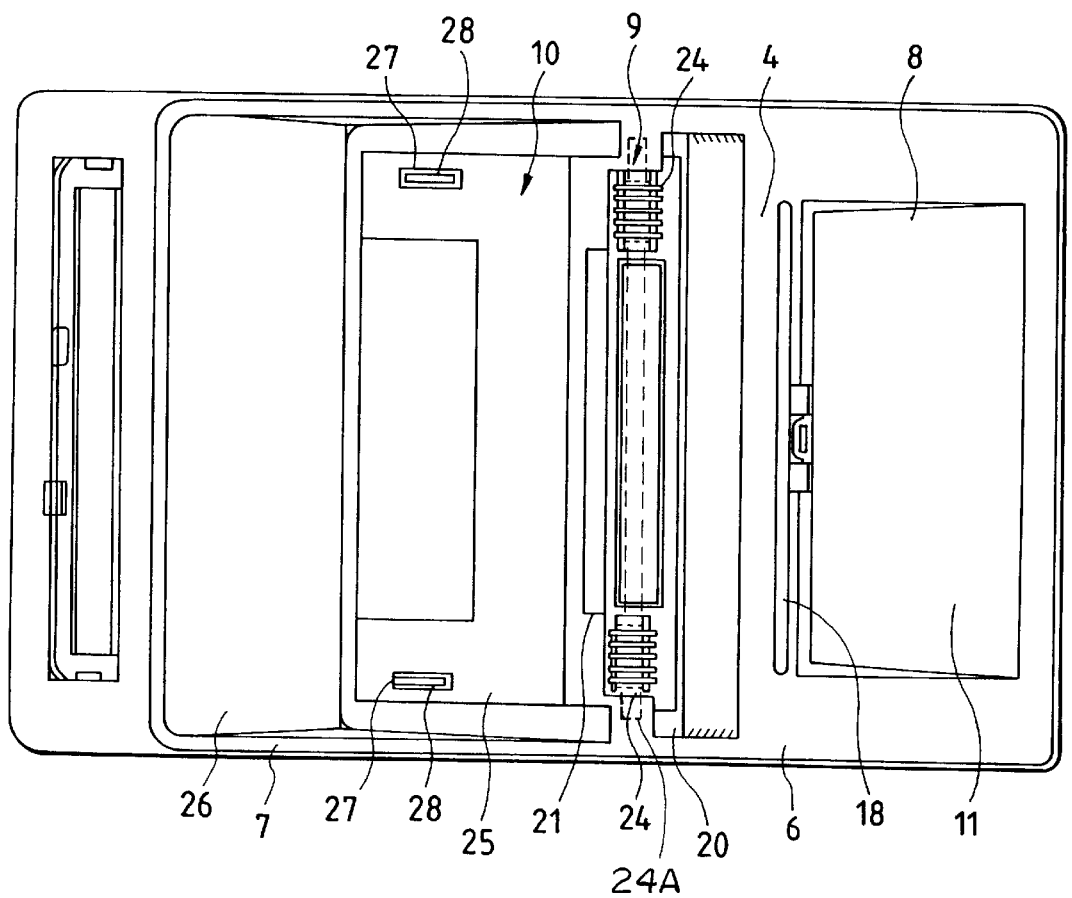
FIG. 4 is a top view of the electronic cash register in FIG. 1.
Figure 5:
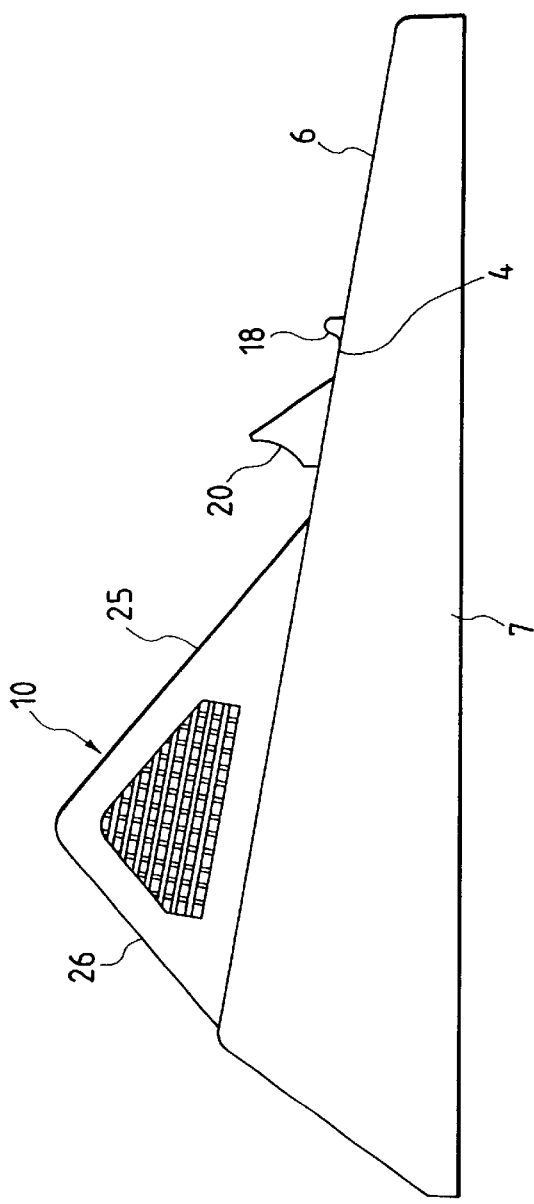
FIG. 5 is a side view which shows an upper casing of a housing of an electronic cash register.
Figure 6:
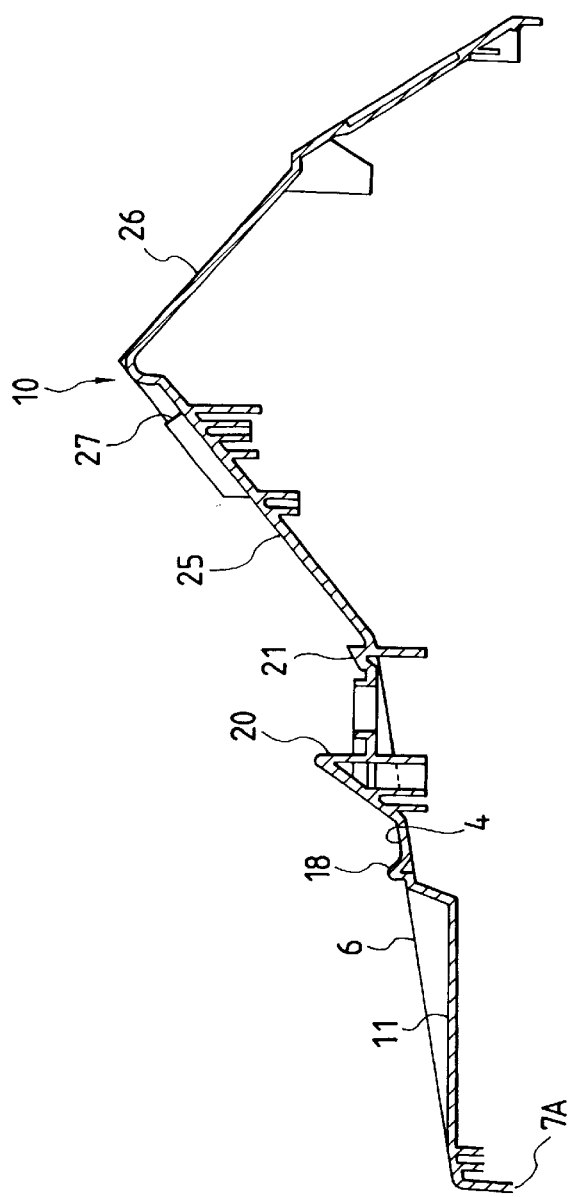
FIG. 6 is a longitudinal cross sectional view of the upper casing in FIG. 5.

The upper casing 3, as shown in FIGS. 4 to 6, includes an upper wall 6 and a side wall 7 surrounding the periphery of the upper wall 6. The side wall 7 has an engaging portion 7A formed on a lower edge thereof. The upper wall 6 has formed thereon a bill holder 8, a pen holder 4, a bearing assembly 9, and a display mount 10. The lower casing 2 and the upper casing 3 are joined in tight engagement of the engaging portions 5 with the engagement portion 7A.

Figure 7:
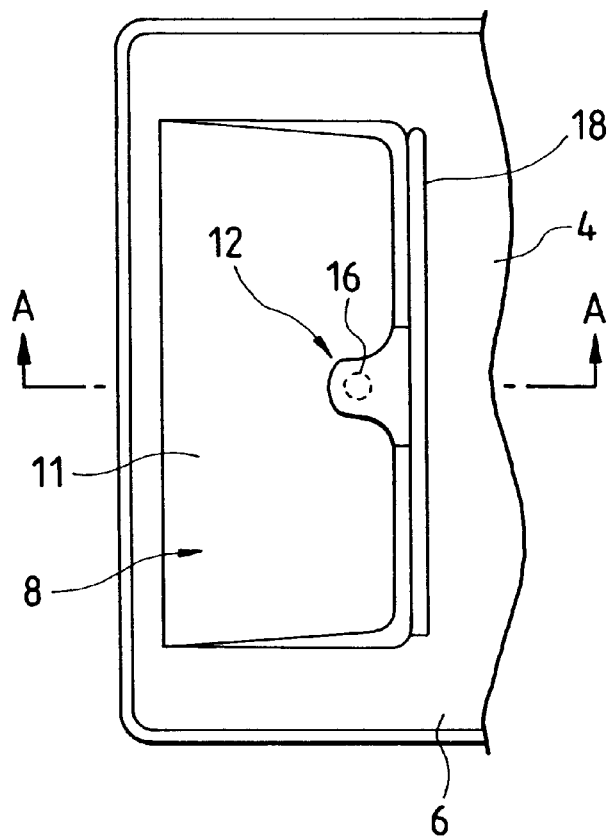
FIG. 7 is a partial plan view which shows a bill holder.
Figure 8A:
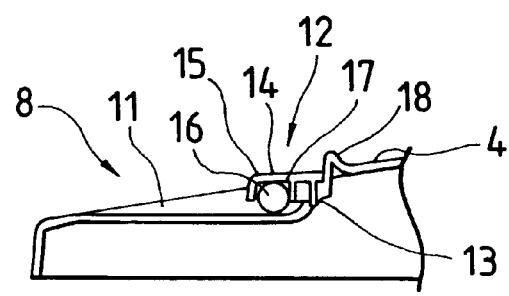
FIGS. 8(a) and 8(b) are partial cross sectional views taken along the line A—A in FIG. 7.
Figure 8B:
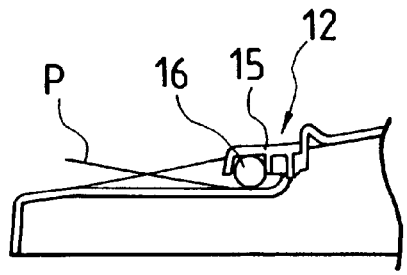
Figure 9:
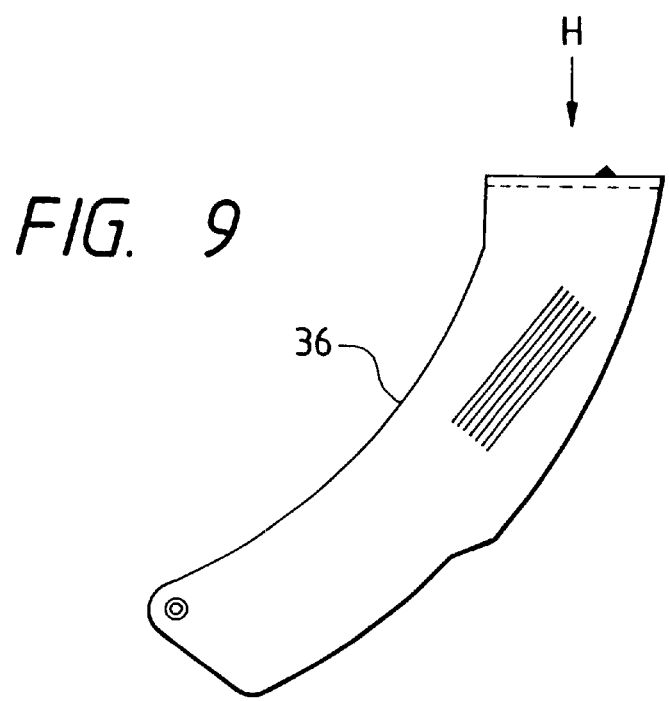
FIG. 9 is a side view which shows a stay supporting tilting motion of a display.

The bill holder 8, as clearly shown in FIGS. 7, 8(a), and 8(b), has a bill tray 11 formed with a flat recess. A bill holding mechanism 12 is disposed on the center of a rear end of the bill tray 11. The bill holding mechanism 12 includes a holder latch 13 formed on a rear wall of the bill tray 11, a holder 14 secured detachably by the holder latch 13, a cushion plate 15 retained by the holder 14, and a steel ball 16. The holder 14 has formed therein a cushion chamber 17 in which the cushion plate 15 and the steel ball 16 are disposed. The cushion plate 17 produces elastic pressure urging the steel ball 16 into constant engagement with the bill tray 11, thereby allowing, as indicated by P in FIG. 8(b), a bill to be held between the bill tray 11 and the steel ball 16 tightly.

The upper wall 6 has the pen holder 4 formed behind the bill holder 8. The pen holder 4 is defined by a protrusion 18 extending in a width-wise direction of the upper wall 6 in parallel to the rear wall of the bill holder 8.

The bearing assembly 9 includes, as clearly shown in FIGS. 4 to 6, a front display mount protrusion 20, a rear display mount protrusion 21, and right and left bearings 24. The display mount protrusions 20 and 21 extend in the width-wise direction of the upper casing 3. The bearings 24 are disposed between the display mount protrusions 20 and 21.

The display mount 10 includes a font slant wall 25 and a rear slant wall 26. Rectangular walls 27, as clearly shown in FIGS. 4 and 6, are formed on both sides of the front slant wall 25. The rectangular walls 27 have formed therein stay guide slots 28.

Figure 2:
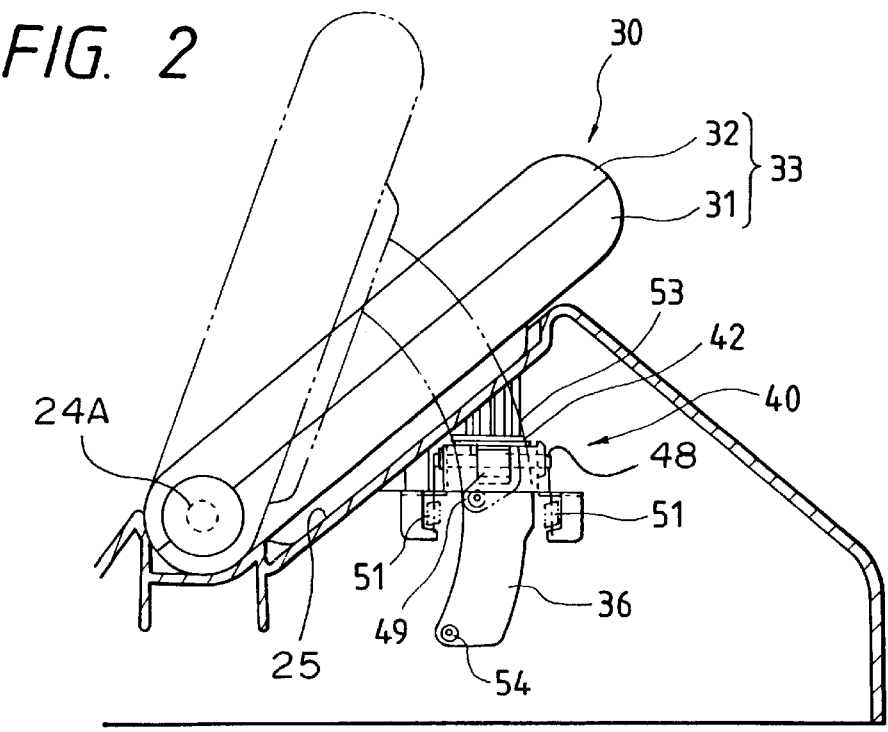
FIG. 2 is a partially cross sectional view which shows a display angle adjustable mechanism.

The display 30 is, as shown in FIGS. 1 and 2, pivotably supported by the bearing assembly 9. The display 30 includes a casing 33 consisting of rear and front covers 31 and 32, a touch sensitive panel 34, and a protective sheet 35. The touch sensitive panel 34 is installed in the front cover 32. The protective sheet 35 covers the surface of the touch sensitive panel 34. The rear cover 31 has recesses formed in right, left, and upper edges of a peripheral wall 31A thereof for engagement with claws formed on the front cover 32 and also has a pair of cover bearings (not shown) mounted on right and left lower portions of an inner wall thereof. The cover bearings are arranged in alignment with the bearings 24 of the bearing assembly 9. A supporting shaft 24A is inserted through the cover bearings of the rear cover 31 and the bearings 24 of the bearing assembly 9 to support the rear cover 31 pivotably so that the display 30 may tilt back and forth (i.e., a lengthwise direction of the cash register) within a given angular range.

Figure 10:
FIG. 10 is a top view as viewed from the direction H in FIG. 9.

A pair of stays 36 are installed at flanges 36A, as shown in FIG. 10, on right and left portions of an outer wall of the rear cover 31 using screws and inserted into the stay guide slots 28 formed in the display mount 10.

Figure 12:
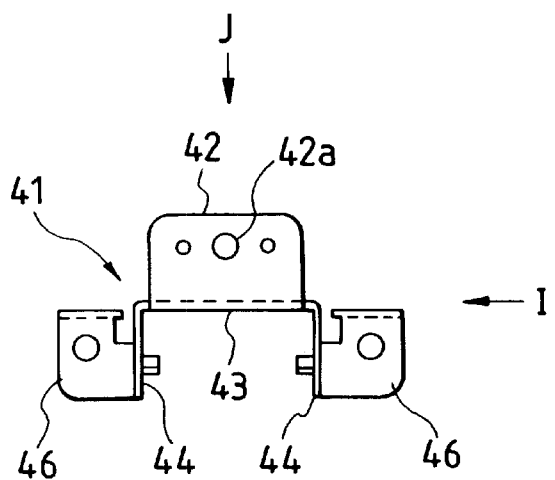
FIG. 12 is a plan view which shows a stay holder.
Figure 13:
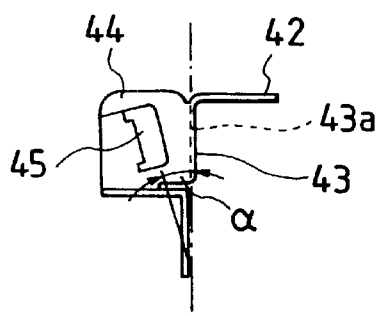
FIG. 13 is a side view as viewed from the direction I in FIG. 12.
Figure 14:
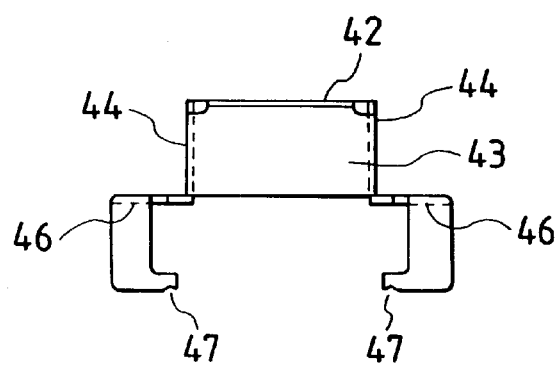
FIG. 14 is a front view as viewed from the direction J in FIG. 12.
Figure 15:
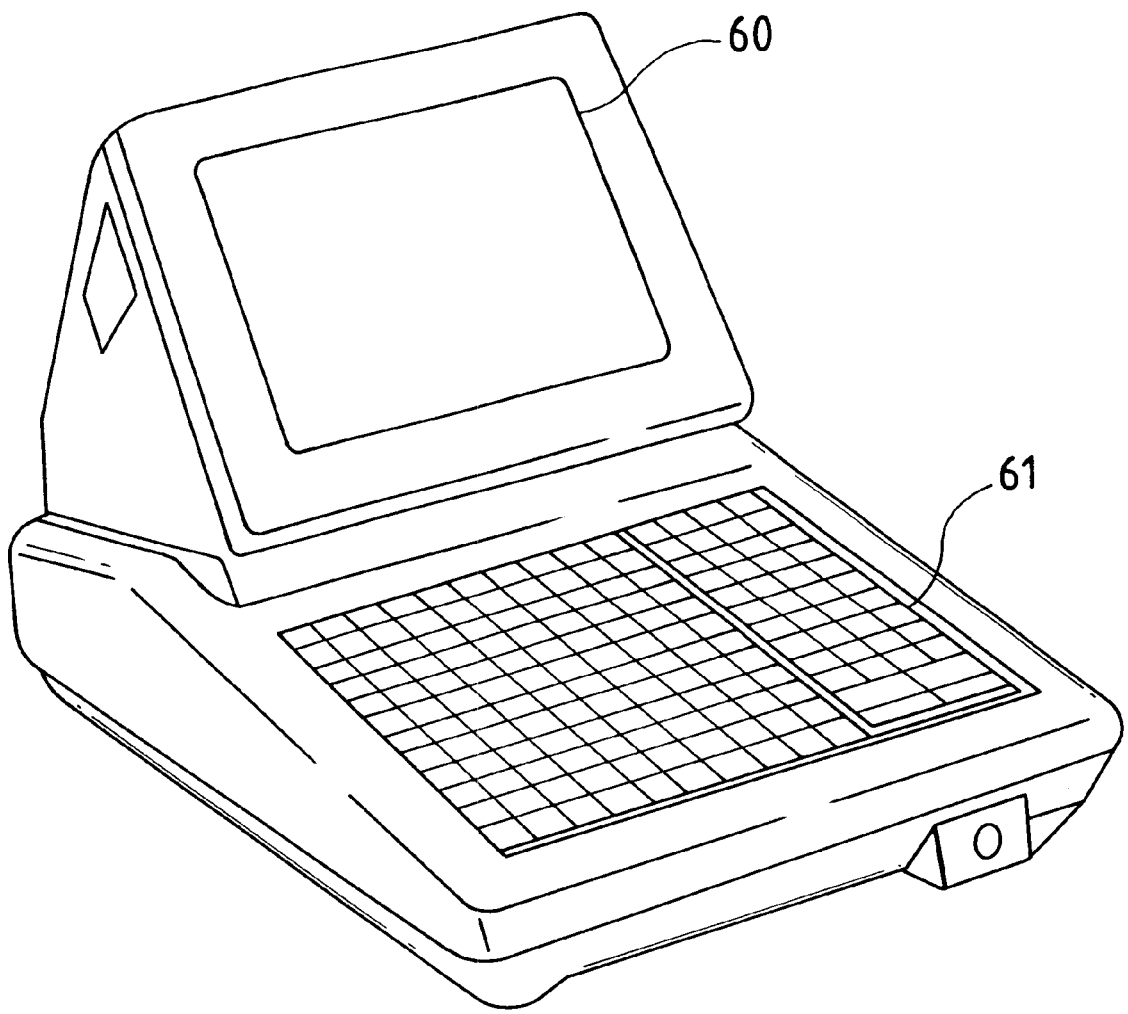
FIG. 15 is a perspective view which shows a conventional electronic cash register.

A display tilt adjusting mechanism 40, as clearly shown in FIG. 2, which adjusts an angular position of the display 30 is disposed on an inner surface of the front slant wall 25 of the display mount 10. The display tilt adjusting mechanism 40 includes stay holders 41 each of which, as shown in FIGS. 12 to 14, has a plate 43 bent at right angles to a mount flange (or major wall) 42 having a mount hole 42a formed therein and a pair of shaft retainers 44 bent at right angles to both sides of the plate 43. The shaft retainers (or side walls) 44 each have, as shown in FIG. 13, formed therein an elongated hole 45 which extends with an inclination of α (e.g., 15°) to the surface 43a of the plate 43. The shaft retainers 44 each have a mount plate 46 bent at right angles which has formed thereon a spring hook 47.

Figure 3A:
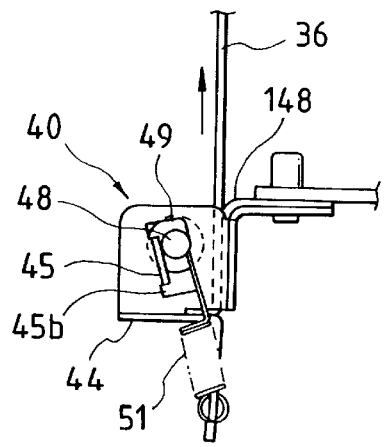
FIG. 3(a) is a partial view which shows a stay holder when a stay is moved upward.
Figure 3B:
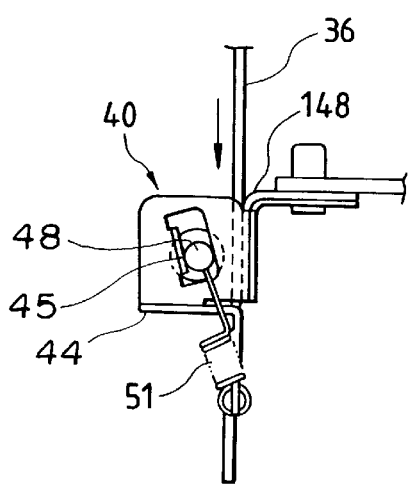
FIG. 3(b) is a partial view which shows a stay holder when a stay is moved downward.
Figure 11:
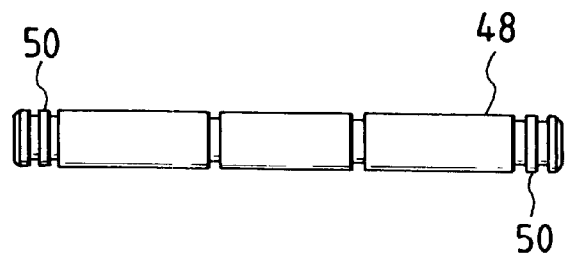
FIG. 11 is an illustration which shows a support shaft installed in a stay holder.

A resinous sliding plate 148 is, as shown in FIGS. 3(a) and 3(b), attached to the surface 43a of the plate 43 for facilitating ease of movement of the stay 36. A support shaft 48, as shown in FIGS. 2, 3(a), 3(b), and 11 is inserted through the elongated holes 45 of the shaft retainers 44 so as to be movable in a lengthwise direction of the elongated holes 45. The support shaft 48 has a roller 49 wound therearound. The support shaft 48, as shown in FIG. 11, has formed in ends thereof grooves 50. Coil springs 51 are hung at one end on the grooves 50 of the support shaft 48 and at the other end on the spring hooks 47 of the mount plates 46, respectively, to elastically urge the support shaft 48 to lower ends 45b of the elongated holes 45 to bring the roller 49 into engagement with the sliding plate 148.

The display tilt adjusting mechanism 40 thus constructed is disposed in the upper casing 3 with the mount flanges 42 of the stay holders 41 secured using screws on a mount block 53, as shown in FIG. 2, formed on the inner wall of the upper casing 3. Each of the stays 36 extending through one of the stay guide slots 28 inward of the upper casing 3 passes through a nip formed by the roller 49 and the sliding plate 148 of one of the stay holders 41. Each of the stays 36 has disposed on an end a stopper 54, as shown in FIG. 2, which is made of a protrusion for avoiding dislodgment of the stay 36 from the stay holder 41.

In operation, when it is required to tilt the display 30 frontward, an operator pulls the display 30 manually. This causes, as shown in FIG. 3(a), each of the stays 36 to be moved upward, thereby lifting up the roller 49 slightly which is pressed against the stay 36, so that the support shaft 48 is moved upward against the spring pressure of the coil spring 51 along the elongated hole 45. The elongated hole 45 is, as described above, oriented at the angle α to the surface 43a of the plate 43. The upward movement of the support shaft 48, thus, causes the roller 49 to move into disengagement from the surface of the stay 36, thereby releasing the stay 36 from the nip formed by the roller 49 and the sliding plate 148, which allows the display 30 to be tilted frontward smoothly.

When the tilting motion of the display 30 is stopped by the operator, it will cause the support shaft 48 of each of the stay holders 41 to be urged downward by the spring pressure of the coil spring 51 to press the stay 36 against the sliding plate 48 to lock the stay 36, so that the display 30 is held at a desired angle.

When it is required to tilt the display 30 backward, the operator pushes the display 30 manually.. This causes the stays 36 to be moved downward. The downward movement of each of the stays 36 increases the nip provided by the roller 49 and the sliding plate 148. When the operator pushes the display 30 with pressure greater than the nips of the stays 36, each of the stay 36, as clearly shown in FIG. 3(b), slides downward along the sliding plate 148. When the operator stops pushing the display 30, the display 30 is held at a desired angle.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A display tilt adjusting apparatus comprising:
   a pivotal support member supporting a display unit pivotably within a given angular range;
   a stay connected to the display unit; and
   a stay holding mechanism holding said stay to keep a display surface of the display unit at a set angular position, said stay holding mechanism producing a given degree of resistance to movement of the stay in a first direction in which the display surface tilts rearward and keeping the stay free from said resistance in response to movement of the stay in a second direction opposite the first direction in which the display surface tilts frontward.

2. A display tilt adjusting apparatus as set forth in claim 1, wherein said stay is made of a strip member, and wherein said stay holding mechanism includes a holder, a sliding member, a roller, and an elastic member, the holder retaining the sliding member, the roller, and the elastic member, the sliding member guiding sliding movement of said stay in the first and second directions, the elastic member elastically pressing the roller against the sliding member to form a nip therebetween through which said stay passes, the roller being supported by the holder to be movable in a third direction oriented at a given angle to the first and second directions in which the roller is responsive to the movement of said stay in the second direction to move to release said stay from the nip.

3. A display tilt adjusting apparatus as set forth in claim 2, wherein the holder of said stay holding mechanism includes a plate member having a major wall and side walls extending from the major wall substantially perpendicular to the major wall, the sliding member being attached to the major wall, the side walls having formed therein elongated holes through which the roller is inserted and which extend in said third direction, the elastic member being made of a spring connected to an end of the roller and a portion of the holder to urge the roller against the sliding member to form the nip through which said stay passes.

4. An information terminal device comprising:
   a housing;
   a display unit mounted on said housing pivotably within a given angular range; and
   a display tilt adjusting mechanism including,
      a stay having a given length, said stay being connected at one end to the display unit; and
      a stay holding mechanism holding said stay to keep a display surface of said display unit at a set angular position, said stay holding mechanism producing a given degree of resistance to movement of the stay in a first direction in which the display surface tilts rearward and keeping the stay free from said resistance in response to movement of the stay in a second direction opposite the first direction in which the display surface tilts frontward.

* * * * *